United States Patent [19]  [11] Patent Number: 4,690,251
Onoda et al.  [45] Date of Patent: Sep. 1, 1987

[54] EMERGENCY CONTROL SYSTEM FOR ELEVATORS

[75] Inventors: Yoshimitsu Onoda, Toride; Hiroshi Goko, Tokyo, both of Japan

[73] Assignees: Hitachi, Ltd.; Hitachi Engineering and Service Co., Ltd., both of Tokyo, Japan

[21] Appl. No.: 850,096

[22] Filed: Apr. 10, 1986

[30] Foreign Application Priority Data

Apr. 10, 1985 [JP] Japan ................................. 60-74303

[51] Int. Cl.⁴ ............................................. G01P 15/00
[52] U.S. Cl. ..................................................... 187/107
[58] Field of Search .............................. 187/29 R, 107

[56] References Cited

U.S. PATENT DOCUMENTS 3,792,759 2/1974 Kirsch .............................. 187/29 R
4,382,489 5/1983 Susuki et al. ..................... 187/29 R Primary Examiner—William M. Shoop, Jr.
Assistant Examiner—Richard K. Blum
Attorney, Agent, or Firm—Antonelli, Terry & Wands

[57] ABSTRACT

An emergency control system for an elevator has a circuit for producing a signal in response to a relatively small vibration of a structure in which the elevator is installed; a first circuit responsive to the signal for controlling the operation of the elevator under a predetermined mode for a first predetermined time interval; and a second circuit for disabling the signal producing circuit simultaneously with the start of operation of the first circuit and enabling the signal producing circuit for a second predetermined time interval longer than the first predetermined time interval.

5 Claims, 2 Drawing Figures

EMERGENCY CONTROL SYSTEM FOR ELEVATORS

BACKGROUND OF THE INVENTION

The present invention relates to an emergency control system for elevators, and more particularly to a control system for elevators suitable for regulating the operation of the elevators while an earthquake occurs.

During an earthquake-operation for elevators proposed heretofore, upon detection of an occurrence of an earthquake, the cage of an elevator is driven to stop at the nearest floor, the door is opened and thereafter the operation of the elevator is suspended. In one of such conventional earthquake-operations, an initial slight vibration caused by an earthquake is detected to immediately stop the cage at the nearest floor and make passengers take refuge prior to the occurrence of a strong vibration of the earthquake. However, the detector for detecting an initial slight vibration operates in response to relatively weak vibration so that the elevator is not subjected to damage. Therefore, there arises a problem that the elevator may be undesirably driven into an earthquake-operation by a vibration not resulting from an earthquake.

Of the control systems proposed heretofore, there is known a control system disclosed for example in Japapense Patent Unexamined Publication No. 55-106980, wherein the system comprises first and second detectors responsive respectively to big and small vibrations; a first circuit responsive to the first detector for conducting a predetermined, preliminary earthquake-operation for a predetermined time interval; and a second circuit responsive to the second detector for conducting a predetermined, main earthquake-operation; wherein the first circuit is disabled during the predetermined time interval so as not to be responsive to the first detector.

With the control system as above, however, if a big earthquake does not occur there also arises a problem: since the first circuit is enabled after the lapse of the predetermined time interval, the first detector responds to a slight main earthquake (which is not sufficiently strong for actuating the second detector) which may occur after the initial, slight vibration. As a result, the first circuit is initiated to again conduct a preliminary earthquake-operation, thereby resulting in repetitive stoppages of the elevator.

SUMMARY OF THE INVENTION

It is an object of the present invention to solve the above problems and provide an emergency control system for elevators capable of attaining an efficient operation of elevators by preventing unnecessary stoppages of the elevators.

To achieve the above object, the emergency control system of the present invention comprises a circuit for producing a signal in response to a relatively small vibration of a structure to which an elevator is installed; first means responsive to the signal for conducting a predetermined, preliminary earthquake-operation for a first predetermined time interval; and second means for disabling the signal producing circuit simultaneously with initiation of the operation of the first means and enabling the signal producing circuit after lapse of a second predetermined time interval longer than the first predetermined time interval.

According to the present invention, a preliminary, earthquake-operation is conducted for the first predetermined time interval in response to a relatively small vibration of an earthquake. However in this case, once the emergency control system is actuated, it does not respond to a small vibration of an earthquake at least for the relatively long, second predetermined time interval. Thus, preliminary earthquake-operations are not unnecessarily repeated.

DESCRIPTION OF THE PREFERRED EMBODIMENTS

Figure 1:
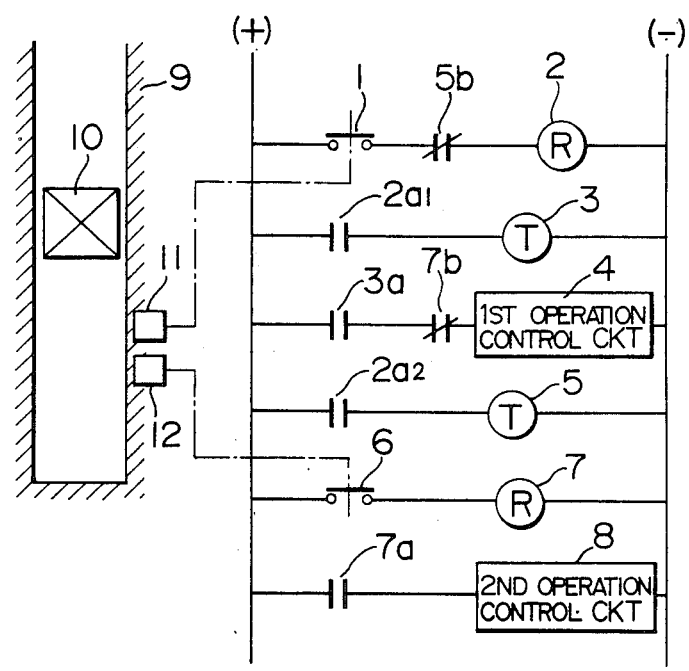
FIG. 1 is a block diagram showing an essential part of an electric circuit according to the present invention.

Referring to FIG. 1, a first detector 11 operates in response to a relatively small vibration such as an initial small vibration of an earthquake at a magnitude of 5 to 10 Gal or more. The first detector 11 is mounted at a proper location of a structure such as a building to which an elevator is installed. A switch 1 is caused to close upon initiation of the operation of the first detector 11. The switch 1 may be directly mounted within the first detector. A relay 2 has normal-open contacts 2a1 and 2a2 which are closed when the relay 2 operates. A timer 3 operates upon energization and continues its operation, even after de-energization, for a predetermined time interval, e.g., one minute. A normal-open contact 3a is maintained closed while the timer 3 operates. A first operation control circuit 4 is for conducting a predetermined, first mode emergency operation or preliminary earthquake-operation of the elevator. The circuit is connected to a known elevator control circuit (not shown) which controls the operation of the elevator cage 10. The circuit operates in such a way that calling the cage 10 is effected from all of the floors where the cage 10 can stop, whereby if the cage 10 is running it is stopped at the nearest floor and the operation is inhibited from starting again until the circuit becomes disabled. A timer 5 has a similar construction as of the timer 3, but the timer 5 continues its operation, after de-energization, for a time interval longer than that of the timer 3, e.g., four minutes. A normally-closed contact 5b is maintained opened while the timer 5 operates. A second detector 12 operates in response to a large vibration of an earthquake, for example, a vibration of 80 Gal or larger. Similar to the first detector 11, the second detector 12 is mounted at a proper location of the building. A switch 6 is caused to close upon initiation of the operation of the second detector 12. The switch 6 may be directly mounted within the second detector. A second delay 7 has a normally-open contact 7a and a normally-closed contact 7b respectively closing and opening while the relay 7 operates. A second operation control circuit 8 is for conducting a predetermined, second mode emergency operation or main earthquake-operation of the elevator, which is connected to the operation control circuit (not shown) similar to the first operation control circuit. The second operation control circuit 8 operates in such a way that after the cage 10 is stopped at the nearest floor, the operation of the elevator is suspended. In particular, even after the second operation control circuit is de-energized, the operation cannot be resumed unless an operator releases the emergency operation by manually operating a key switch (not shown) separately provided.

Next, the operation of the circuit shown in FIG. 1 will be described. When an initial slight vibration of an earthquake occurs and the first detector 11 operates to close the switch 1, the relay 2 is energized because the contact 5b is closed and the contacts 2a therefore close. Consequently, the timer 3 is energized to close its contact 3a, thereby actuating the first operation control circuit 4 to conduct a preliminary earthquake-operation for a time interval determined by the timer 3.

In the case where a big earthquake occurs during the preliminary earthquake-operation, the second detector 12 operates to close the switch 6 and energizes the relay 7. Consequently, the contact 7a is closed to actuate the second operation control circuit 8 and suspend the operation of the elevator.

Generally, a big earthquake or main earthquake occurs a predetermined time after occurrence of an initial, slight vibration. Most of the big, main earthquakes which cause damage occur within one minute, so that the time interval of a preliminary earthquake-operation is commonly set at one minute. However, if an earthquake occurs at a remote place, it takes a long time, even up to three minutes, for the main earthquake to occur. In case of such an earthquake, actual damage is rarely experienced so that it is not practical to unnecessarily stop the elevator.

In view of the above, the time interval of a preliminary earthquake-operation is commonly set at one minute and the elevator resumes its normal operation after one minute. The first detector is however set so as to operate in response to an initial slight vibration, i.e., 5 to 10 Gal. Therefore, even when the main earthquake which might not cause damage occurs one or three minutes later, the first detector is again triggered to operate so that the conventional circuit corrresponding to the circuit 4 is actuated and a preliminary earthquake-operation is again carried out.

To solve the above problem, according to the present invention, when the first detector 11 operates and the relay 2 is energized, the contacts 2a are closed and the timer 5 is actuated. Since the timer 5 maintains its operation state for four minutes even after the contacts 2a and are opened, the contact 5b is opened so that the relay 2 is not allowed to operate even when the switch 5 is closed. Therefore, once a preliminary earthquake-operation is effected upon occurrence of an earthquake, another preliminary earthquake-operation is not again initiated in response to slight vibrations generally occurring within four minutes after the initial vibration of the earthquake. Thus, unnecessary and repetitive stoppages of the operation can be avoided.

The present invention is not intended to be limited to the above-described embodiment. For example, in the above embodiment, the cage is stopped at the nearest floor in both preliminary and main earthquake-operations, but the cage may be stopped at the nearest floor among a plurality of predetermined refuge floors. Also, in the above embodiment, although the control circuit is constructed by way of hardware arrangement using elements such as relays, timers, switches and the like, the circuit except the first and second detectors and the first and second operation control circuits may be realized by way of software arrangement using a micro computer. An embodiment of such arrangement will be explained with reference to FIG. 2.

Figure 2:
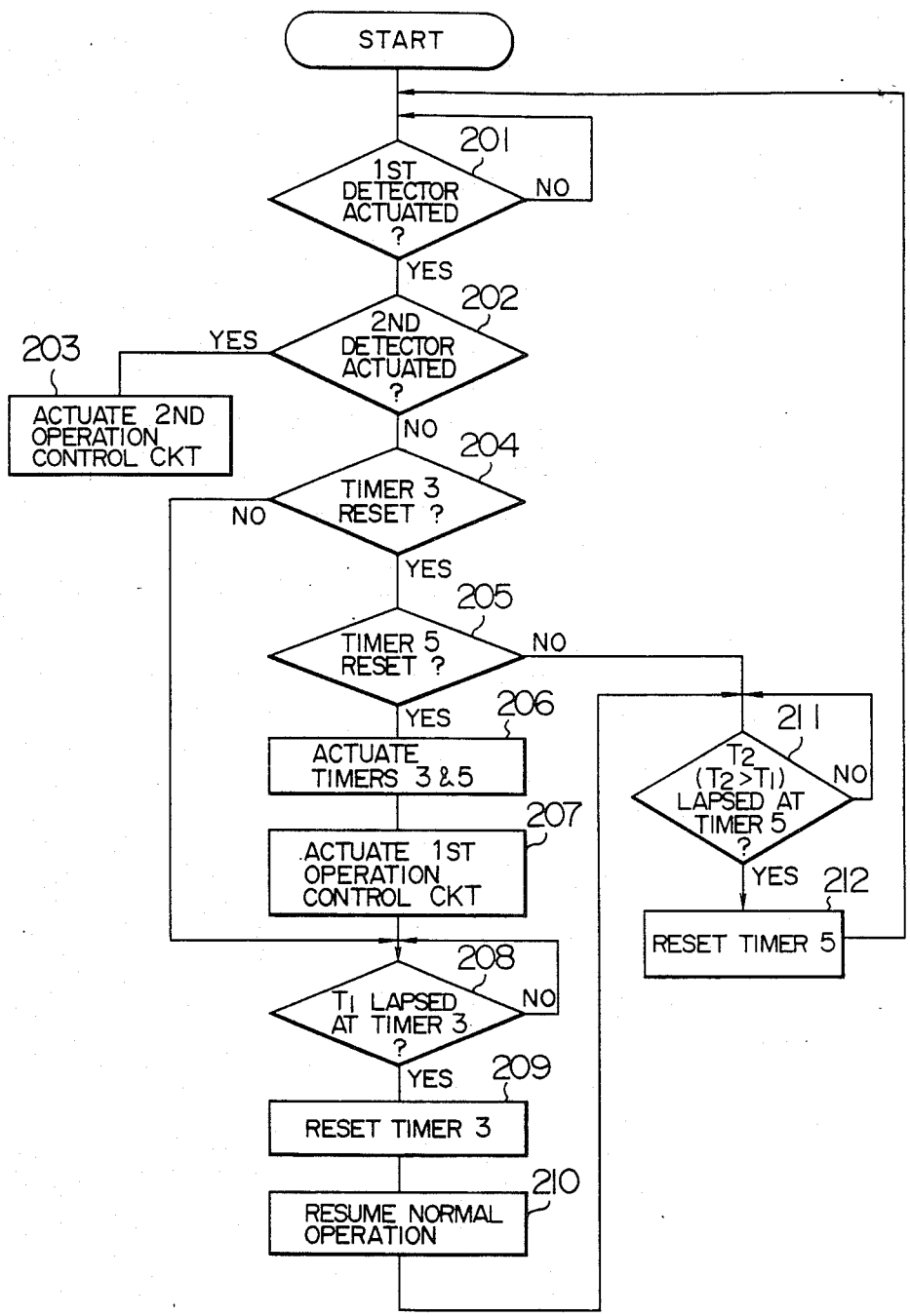
FIG. 2 shows a flow chart of operation of another embodiment according to the present invention.

FIG. 2 is a flow chart showing the operations performed by a micro computer, wherein basically the circuit operations of the FIG. 1 embodiment are realized by way of software and therefore the same advantageous effects as the FIG. 1 embodiment can be attained. Referring now to FIG. 1, upon actuation of the control system, initialization is effected as well known (not shown). In this case, the initialization includes that for the timers 3 and 5. In this state, the operations of the first and second detectors are waited for (step 201, 202). If the first detector operates (step 201) and also the second detector operates (step 202), the second operation control circuit is immediately actuated (step 203) to conduct a main earthquake-operation. In the case where the first detector operates but the second detector does not operate, i.e., in a case where only an initial slight vibration occurs, it is checked to see if the timer 3 is reset (step 204). If the timer 3 is reset, it is checked to see if the timer 5 is reset or not (step 205). At the time when the first, slight vibration occurs, both timers 3 and 5 are obviously in a reset state so that they are actuated at this time (step 206) and hence the first operation control circuit is actuated to conduct a preliminary earthquake-operation (step 207). Next, after a lapse of a predetermined time interval T1 after the actuation of the timer 3 (step 208), the timer 3 is reset (step 209) to resume a normal operation of the elevator. After a lapse of a predetermined time interval T2 following the actuation of the timer 5 (step 211), the timer 5 is reset (step 212) to resume step 201.

The state that the timer 3 is not being reset at step 204 happens when a next slight vibration occurs during the preliminary earthquake-operation. In this case, the first operation control circuit is not actuated, but step 208 follows to monitor the lapse of the predetermined time interval T1 of the timer 3. Also, the state that the timer 5 is not being reset at step 205 happens when a next slight vibration occurs after the preliminary earthquake-operation and before the lapse of the predetermined time interval T2 of the timer 5. According to the present invention, in such a case the flow jumps to step 211 to check the lapse of the predetermined time interval T2.

As described so far, according to the present invention, the actuation of the first operation control circuit is inhibited for a predetermined time interval after the end of the preliminary earthquake-operation even when a next slight vibration occurs, so that preliminary earthquake-operations are not repeated, thereby preventing unnecessary stoppages of the elevator and improving the operation efficiency.

I claim:

1. An emergency control system for an elevator comprising:
    signal producing means for producing a signal in response to vibration of a structure in which the elevator is installed when the vibration of the structure is at a level in magnitude larger than a predetermined level;
    first means responsive to said signal for effecting a predetermined mode of emergency operation on the elevator for a predetermined first time interval; and
    second means for disabling said signal producing means for a predetermined second time interval upon initiation of the operation of said first means, said predetermined second time interval being longer than said first predetermined time interval.

2. A control system according to claim 1, further comprising second signal producing means for producing a second signal in response to the vibration of the structure when the vibration is at a level in magnitude larger than a predetermined second level which is larger than said first-mentioned level, and third means operating, in response to said second signal to effect a second mode of emergency operation on the elevator.

3. A control system according to claim 2, wherein the vibration is such a vibration as caused by an earthquake and a cage of the elevator is driven, in said first mode of the emergency operation, to a nearest one of floors which the elevator generally serves from a position where the cage is located when the emergency operation is initiated and inhibited from further moving from the nearest floor for said first time interval.

4. A control system according to claim 3, wherein the cage of the elevator is driven, in said second mode of emergency operation, to a nearest one of the floors where the cage is located when said second mode emergency operation is initiated and inhibited from further moving from there unless said second mode emergency operation is manually cancelled.

5. An emergency control system for an elevator installed in a building, said system comprising:
  a detector for detecting a vibration of the building caused by an earthquake, when the vibration is at a level in magnitude larger than a predetermined level,
  first means responsive to said detector for initiating a predetermined mode of emergency operation of the elevator and for terminating the emergency operation after a lapse of a predetermined first time interval; and
  second means for disabling said first means, after initiation of said predetermined mode of emergency operation of the elevator, by inhibiting response to said detector for a predetermined second time interval longer than said first time interval.

* * * * *

UNITED STATES PATENT AND TRADEMARK OFFICE
CERTIFICATE OF CORRECTION

PATENT NO. : 4,690,251

DATED : September 1, 1987

INVENTOR(S) : Yoshimitsu Onoda et al

It is certified that error appears in the above-identified patent and that said Letters Patent is hereby corrected as shown below:

On the title page assignee should read

--(73) Assignee: Hitachi, Ltd. and Hitachi Elevator Engineering and Service Co., Ltd., both of Tokyo, Japan --.

Signed and Sealed this

Nineteenth Day of July, 1988

Attest:

DONALD J. QUIGG

Attesting Officer

Commissioner of Patents and Trademarks